United States Patent
Tsai et al.

(10) Patent No.: US 6,938,266 B2
(45) Date of Patent: Aug. 30, 2005

(54) WRITE-ONCE OPTICAL RECORDING MEDIUM WITH ZNO NEAR-FIELD OPTICAL INTERACTION LAYER

(75) Inventors: Din-Ping Tsai, Taipei (TW); Yu-Hsuan Lin, Taipei (TW); Hsun-Hao Chang, Taipei (TW)

(73) Assignee: National Taiwan University, Taipei (TW)

( * ) Notice: Subject to any disclaimer, the term of this patent is extended or adjusted under 35 U.S.C. 154(b) by 305 days.

(21) Appl. No.: 10/337,785

(22) Filed: Jan. 8, 2003

(65) Prior Publication Data
US 2003/0218970 A1 Nov. 27, 2003

(30) Foreign Application Priority Data
May 27, 2002 (TW) ....................... 91207655 U

(51) Int. Cl.$^7$ ................................ G11B 7/24
(52) U.S. Cl. ................................ 720/718
(58) Field of Search .................. 369/288, 283, 369/286; 430/270.13, 945, 270; 720/718; 428/64.4

(56) References Cited

U.S. PATENT DOCUMENTS

| | | | |
|---|---|---|---|
| 5,125,750 A | 6/1992 | Corle et al. | 359/819 |
| 5,718,961 A * | 2/1998 | Hong | 428/64.1 |
| 5,761,179 A * | 6/1998 | Iwasaki et al. | 369/59.11 |
| 5,848,043 A * | 12/1998 | Takada et al. | 369/53.3 |
| 6,226,258 B1 | 5/2001 | Tominaga et al. | 369/283 |
| 6,242,157 B1 | 6/2001 | Tominaga et al. | 430/270.13 |
| 6,319,582 B1 | 11/2001 | Tominaga et al. | 428/64.1 |
| 6,340,813 B1 | 1/2002 | Tominaga et al. | 250/216 |
| 2001/0003641 A1 * | 6/2001 | Kunitomo et al. | 430/270.13 |

* cited by examiner

Primary Examiner—A. J. Heinz
Assistant Examiner—Mark Blovin
(74) Attorney, Agent, or Firm—Troxell Law Office, PLLC

(57) ABSTRACT

This invention is a write-once near-field optical medium using a zinc oxide nano-structured thin film as the localized near-field optical interaction layer. This write-once near-field optical medium is a multi-layered body at least comprising: (a) a substrate of transparent material; (b) a first protective and spacer layer formed on one surface of the substrate, which is made of transparent dielectric material; (c) a zinc oxide nano-structured thin film which is capable of causing localized near-field optical interactions; (d) a second protective and spacer layer formed on the localized near-field optical interaction layer, which is also made of transparent dielectric material; (e) a write-once recording layer; (f) a third protective and spacer layer formed on the write-once recording layer, which is also made of transparent dielectric material. Ultra-high density near-field optical recording can be achieved by the localized near-field optical interactions of the zinc-oxide (ZnO) nano-structured thin film that is in the near-field region of the write-once recording layer.

20 Claims, 3 Drawing Sheets

WRITE-ONCE OPTICAL RECORDING MEDIUM WITH ZNO NEAR-FIELD OPTICAL INTERACTION LAYER

FIELD OF THE INVENTION

This invention is a write-once near-field optical disk using a zinc-oxide (ZnO) nano-structured thin film as the localized near-field optical interaction layer. Ultrahigh density near-field recording can be achieved by this write-once optical disk.

BACKGROUND OF THE INVENTION

The conventional optical disks are practical and popular in optical recording media with a fine storage quality and high stability, which have been widely utilized for data storage and multimedia entertainment. Accompanying with the advanced technological development, a mass amount of disks are produced into lots of categories and features, mainly divided into three types, read only, write once, and rewritable. The read-only type disks are CD-DA, CD-ROM, CD-I, VCD, DVD, DVD-ROM, and DVD-Video etc. The write-once type disks are CD-R, DVD-R and so on. The rewritable disks are MD, MO, PD, CD-RW, DVD-RW, and CD-RAM etc.

The recorded contents are coded to digital signals and transfer to the optical signals which are then subsequently focused and delivered by the pick-up head optical lens onto the write-once recording thin film layer to generate the written bits for the written process of the write-once optical disk. Because the written bits on the write-once recording thin film layer are permanent and non-erasable, the write-once optical disk are recorded once only. There is no need for the process of erasing or rewriting. The readout of the write-once optical disk is the collection of the optical signals from the written bits on the write-once recording thin film layer by the focusing pick-up head optical lens, and then subsequently transfers the optical signals to the digital contents.

Currently, the distance between the optical disk and the pick-up head lens is much larger than the wavelength used by the optical disks and disk drivers commercially available. That means the optical recording technology is using far-field optics alone. It is unavoidable that an optical interference or diffraction phenomena will occur due to the wave characteristics of optics, and the spatial resolution of recording and reading is limited by the optical diffraction limit (i.e. $1.22\lambda/(2n\sin\theta)$, wherein $\lambda$ is the wavelength of light used, n is the refractive index of the medium, and $\theta$ is the half angle of the aperture). In the past, the following methods were used to increase the recording capacity of the conventional optical disks:

(1) A more efficient coding and decoding technique.
(2) A small size of all the pits and their pitches of the tracks on optical disks.
(3) Using the shorter wavelength of a light source.
(4) Increase of the numerical aperture value of the objective lens.
(5) Using a volumetric technology such as multi-layer recording, holography, etc.

Aforementioned methods are only the optimizations under the diffraction limit of far-field optics. A most basic way to improve the recording density and break through the diffraction limit is the use of the near-field optical technology. Eric Betzig of the Bell Laboratory, USA, first demonstrated the near-field optical recording using an optical fiber probe in 1992. His results overcome the optical diffraction limit. The recorded density was effectively improved. An Optical fiber prove with an aperture of several tens of nanometers at the fiber end is used for the near-field optical recording and readout on a multi-layered platinum (Pt) and cobalt (Co) magneto-optical medium layer in his work. By controlling the fiber probe in a very close distance which is much smaller than the wavelength used for the experiments, an ultrahigh density recording of 45 Gigabits per square inch was achieved. However, there are several difficulties and disadvantages of using the near-field fiber probe such as the precise control of the distance between the fiber probe and surface of the recording medium (about a few nanometers), the fragility of the fiber probe, low scanning speed, low optical throughput and high optical attenuation (around $10^{-6}$ to $10^{-3}$), and complexity of the fabrication of the nanometer-scale aperture at the end of the fiber probe.

On the other hand, an issued U.S. Pat. No. 5,125,750, disclosed a solid immersion lens (SIL) prototype that was possible and practical to implement the near-field disk drivers by G. S. Kino and his research team on the Stanford University, USA. The method of said patent has a reading/writing head which made of the semi-spherical and the super semi-spherical transparent solids—which have a high refection index, n,—for effective shrinking the reading/writing marks. Thus, said method of optical head could be speeding a reading/writing rate, then by adopting the present disk technology to directly develop into the high density optical recording of near-field disk drivers. In 1995, a company named TeraStor in San Jose, Calif., USA adopted this patented technological SIL as a "flying" reading/writing pick-up head to the near-field optical recording disk drivers, and tried to produce a first optical disk drive in high density optical recording. This high-speed "flying" reading/writing pick-up head had to be effectively controlled under a near-field range. The technical problems of the reliability of the flying pick-up head in the optical near field finally hindered the further developments of the high density near-field optical disk driver.

The issued patents of U.S. Pat. Nos. 8,226,258; 6,242,157; 6,319,582 and 6,340,813, in which Dr. Junji Tominaga disclosed a design, by adding two nano-film layers (SiN in 20 nm and Sb in 15 nm) onto the normally used phase-change optical disk to replace the near-field effect of an optical fiber probe of the near-field scanning microscope, and to carry out the read/write actions beyond the optical diffraction limit.

Aforesaid design shows a usage of alternating of thin-film structure on the disks to reach a near-field ultrahigh density of optical recording. Then accompanying with an improved structure of the film layer of said disks, said structure improved the two main structures of said film layer from a first category (Sb and SiNx,) to a second category (AgOx and $ZnS$—$SiO_2$). However, said film layer of said two categories, which generated a localized near-field optical effect of Sb and AgOx nano-film layer, of their substances/materials are unstable, and can easily lose the properties of localization due to high temperature and the absorption of water vapor.

The present invention is a write-once near-field optical disk with a zinc-oxide (ZnO) nano-structured thin film and a spacer layer such as $ZnS$—$SiO_2$ on the write-once recording layer. The ultrahigh density write-once near-field recording disk can be effectively achieved by this invention.

In summary, aforementioned conventional far-field optical method appears that the short-wavelength of light-source is costly, and the reading/writing spots of a conventional disk driver have an optical diffraction limit, so only the near-field optics with no diffraction limits can effectively improve the recording spot size below the diffraction limits. Additionally, the near-field optical technique of aforesaid near-field scanning probe and SIL near-field optical disk drive have lots of difficulties, which makes said near-field optical disk become an appropriate choice for near-field optical recording. It is known that Sb and AgOx are unstable substances/materials for manufacturing disks, so this invention uses more stable and better localized near-field optical effect of zinc-oxide (ZnO) nano-structured thin film(s) to produce the write-once zinc-oxide (ZnO) near-field optical disks. This invention is to use the stability and the localization effect of the zinc-oxide (ZnO) nano-structured thin film along with a near-field spacer layer of ZnS—$SiO_2$ to achieve an ultrahigh density write-once near-field optical disk. The localized near-field optical effects can be happened between the zinc-oxide (ZnO) nano-structured thin film and write-once recording layer on a transparent substrate in near-field range. There is no diffraction limit for the write-once optical storage using this method.

SUMMARY OF THE INVENTION

This invention Is related to a zinc-oxide (ZnO) nano-structured thin film used in write-once near-field optical disks. Because the near-field optical interactions have no diffraction limits, this write-once near-field optical disk is capable of obtaining ultrahigh recording density and capacity.

The zinc-oxide (ZnO) nano-structured thin film is fabricated along with a near-field spacer layer of ZnS—$SiO_2$ on a write-once recording layer. The localized near-field optical interactions between zinc-oxide (ZnO) nano-structured thin film and the write-once recorded marks on the write-once recording layer can generate the ultrahigh spatial resolution write-in and readout of the write-once recorded marks smaller than the optical diffraction limit.

Another object of this invention is to provide various rang of optimal thickness for said nano-structured thin film layers for a better localized optical effect or interaction under a stable operating circumstance.

Another object of this invention is to provide a structure of multilayered thin film with metallic or glass, or the materials for supporting a process of localized near-field optical effect in the process of write-once or readout of the write-once near-field optical disk.

BRIEF DESCRIPTION OF THE DRAWINGS

The present invention will be better understood from the following detailed description of preferred embodiments of the invention, taken in conjunction with the accompanying drawings, in which.

DESCRIPTION OF THE PREFERRED EMBODIMENTS

The following descriptions of the preferred embodiments are provided to understand the features and the structures of the present invention.

Figure 1:
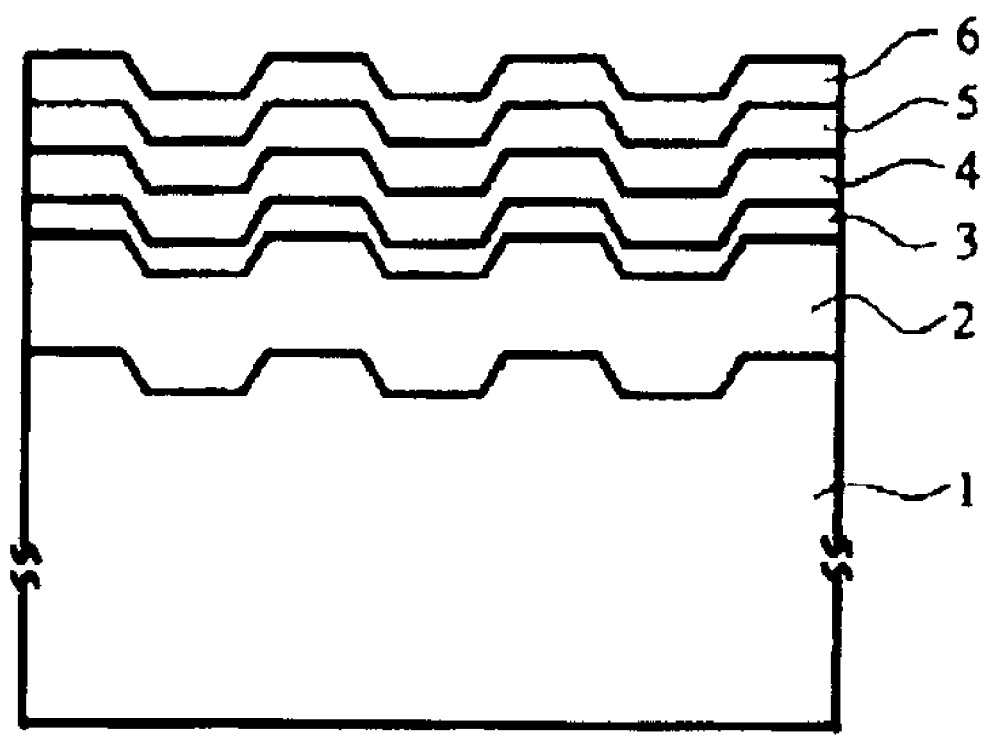
FIG. 1 is a structure diagram showing the write-once optical recording medium with zinc-oxide (ZnO) near-field optical interaction layer for disks in this invention.

FIG. 1 is a structure diagram showing the write-once optical recording medium with zinc-oxide (ZnO) near-field optical Interaction layer for disks according to present invention. The structure of this write-once optical disk comprises a transparent substrate 1 and at least five thin film layers formed on said transparent substrate 1. These five thin film layers consist of at least the first transparent dielectric thin film layer 2, the zinc-oxide (ZnO) nano-structured thin film layer 3 that is capable of causing localized near-field optical effect, the second transparent dielectric thin film layer 4, a write-once recording layer 5, and the third transparent dielectric thin film layer 6. The transparent substrate 1 is made of $SiO_2$ glass materials and doped $SiO_2$ glass materials with Sodium(Na), Lithium(Li), Calcium(Ca), Potassium(K), Aluminum(Al), Germanium(Ge), and Boron (B), etc. in various ratio, or transparent polymerized materials which comprise polycarbonate, or epoxy resin, etc. The first transparent dielectric thin film layer 2, the second transparent dielectric thin film layer 4 and the third transparent dielectric thin film layer 6 are selected from the group of the transparent dielectric materials consisting of ZnS—$SiO_2$, ZnS—$SiO_x$, $SiO_2$, $SiO_x$, or $SiN_x$. The first transparent dielectric thin film layer 2, the second transparent dielectric thin film layer 4 and said third transparent dielectric thin film layer 6 are single or multiple layer structure. The optimal thickness of said first transparent dielectric thin film layer 2 is in the range of about 50 nm to 300 nm. The optimal thickness of said second transparent dielectric thin film layer 4 is in the range of about 5 nm to 100 nm. The optimal thickness of said third transparent dielectric thin film layer 6 is in the range of about 5 nm to 100 nm. The zinc-oxide (ZnO) nano-structured thin film layer 3 that is capable of causing localized near-field optical effect is made of compound of zinc-oxide (ZnO), or the compositions of zinc-oxide and zinc. The optimal thickness of said zinc-oxide (ZnO) nano-structured thin film layer 3 that is capable of causing localized near-field optical effect is in the range of about 5 nm to 100 nm. The write-once recording thin film layer 5 is a write-once material of photo-thermal effect or magneto-optical effect. The material of the write-once recording thin film layer 5 can be organic dyes such as Cyanine, Phthalo-cyanine, Azo, Azo-metal, Azo-metal complex, etc., or inorganic write-once materials such as $Ag_xIn_y$, $TeO_x$ with Gold (Au) or Palladium (Pd), etc. The write-once recording thin film layer 5 is a single or multiple layer structure. The optimal thickness of the write-once recording thin film layer 5 is in the range of about 5 nm to 100 nm.

Figure 2:
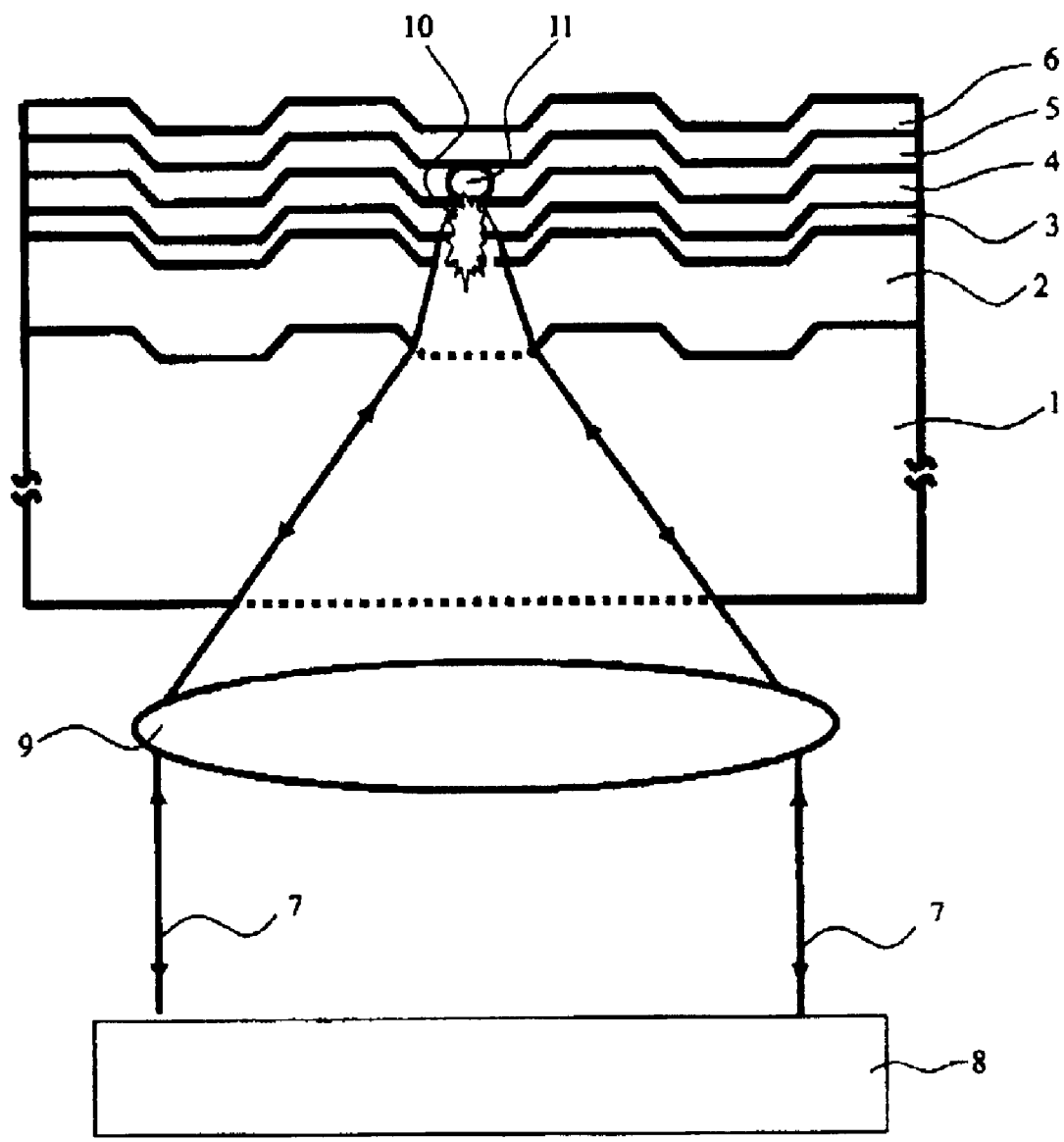
FIG. 2 shows the working principle of reading and writing marks on a write-once optical recording medium with ZnO near-field optical interaction layer for disks in this invention.

FIG. 2 shows the working principle of reading and writing marks on a write-once optical recording medium with ZnO near-field optical interaction layer for disks according to the present invention. The light beams (in/out) 7 of light source via the optical lens 9 of a pick-up head of disk driver 8 penetrate transparent substrate 1 and the first transparent dielectric thin film layer 2 thereto focusing on zinc-oxide (ZnO) nano-structured thin film layer 3 that is capable of causing localized near-field optical effect. The localized near-field optical interaction beyond diffraction limit 10 generated by the interaction of the focused laser and zinc-oxide (ZnO) nano-structured thin film layer 3 can interact with the recorded marks on write-once recording layer 5 to write and read the recorded marks with the size below the optical diffraction limit 11.

Therefore, accompanying with a rotating disk and a high-speed scanning pick-up optical head of a disk driver, the writing and reading action of ultrahigh density write-once optical recording medium can be carried out. The first transparent dielectric thin film layer 2 and the second transparent dielectric thin film layer 4 can protect and stabilize the zinc-oxide (ZnO) nano-structured thin film layer 3 that is capable of causing localized near-field optical effect, and the second transparent dielectric thin film layer 4 maintains a fixed near-field distance between said write-once recording layer 5 and said zinc-oxide (ZnO) nano-structured thin film layer 3 that is capable of causing localized near-field optical effect. The third transparent dielectric thin film layer 6 can protect and stabilize structure of the write-once recording layer 5 and to extend its lifetime.

Figure 3:
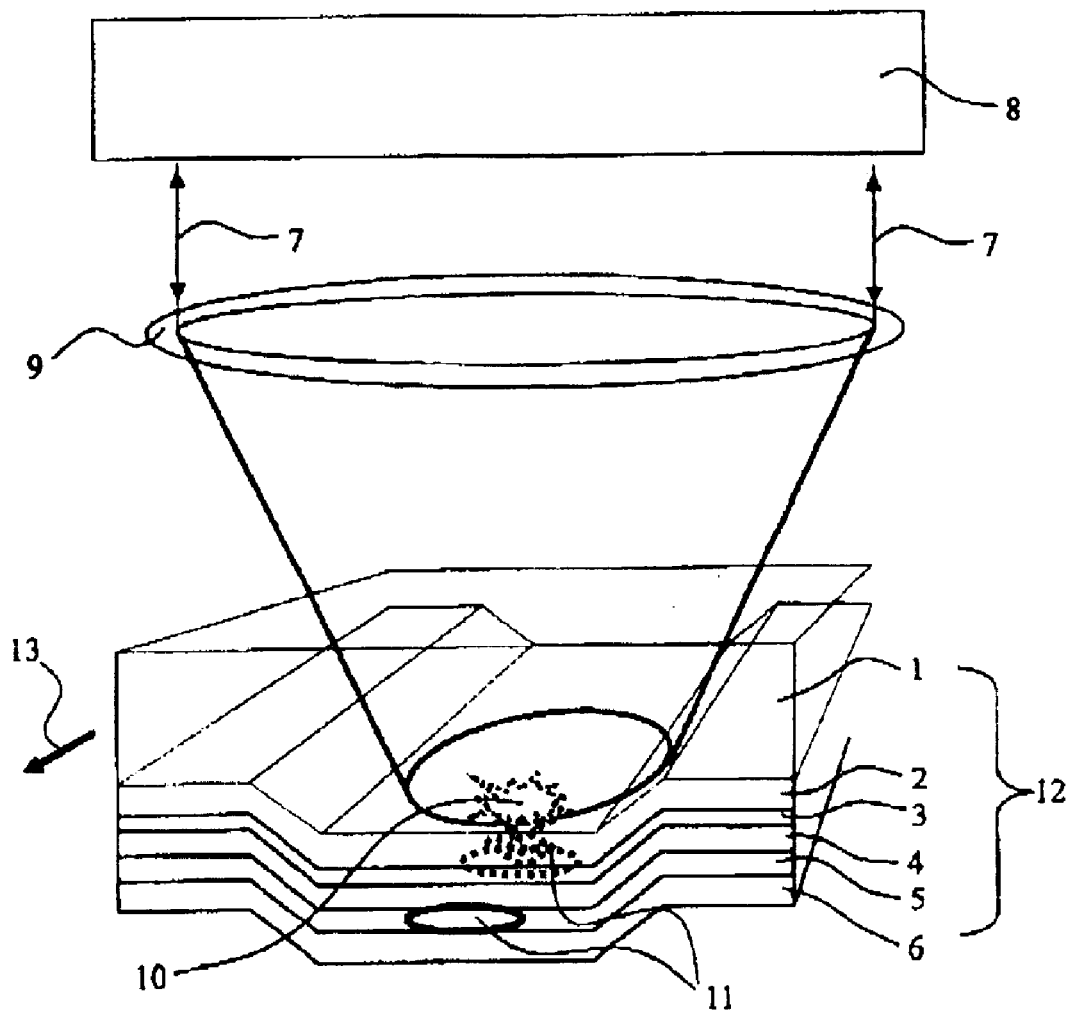
FIG. 3 is a schematic illustration showing one preferred embodiment of the pick-up head and optical lens of a disk driver In coordination with write-once zinc-oxide (ZnO) near-field optical disks in this invention.

As shown in FIG. 3, it is a preferred embodiment of a write-once zinc-oxide (ZnO) near-field optical disk 12 and the pick-up head of disk driver 8. The write-once zinc-oxide (ZnO) near-field optical disk 12 rotates in the rotation direction of optical disk 13, the tracking and focusing mechanism of the disk driver maintains the pick-up head optical lens 9 and pick-up head of disk driver 8 at the proper position to focus on the write-once zinc-oxide (ZnO) near-field optical disk 12. The localized near-field optical interaction beyond diffraction limit 10 coupled between the zinc-oxide (ZnO) nano-structured thin film layer 3 and write-once recording layer 5 can successfully write and read said the recorded marks 11 with the size below the optical diffraction limit.

While this invention has been described in conjunction with particular embodiments, it is evident that alternatives, modifications and variations will now be apparent to those skilled in the art. Accordingly, the present invention is intended to embrace all such alternatives, modifications and variations and fall within the spirit and scope of the appended claims. Moreover, the description and illustration of the invention is by way of example, and the scope of the invention is not limited to the exact details shown or described as well as the order of structure, the values, angles, directions of focusing beams.

What is claimed is:

1. A write-once optical recording medium with an ZnO near-field optical interaction layer for discs comprising:
   a) a transparent substrate;
   b) a first transparent dielectric thin film layer formed on the transparent substrate;
   c) a zinc-oxide nano-structured thin film layer formed on the first transparent dielectric thin film layer and selectively causing a localized near-field optical effect;
   d) a second transparent dielectric thin film layer formed on the zinc-oxide nano-structured thin film layer;
   e) a write-once recording thin film layer formed on the second transparent dielectric thin film layer; and
   f) a third transparent dielectric thin film layer formed on the write-once recording thin film layer,
   wherein the first transparent dielectric thin film layer and the zinc-oxide nano-structured thin film layer are located between the transparent substrate and the write-once recording thin film layer.

2. The write-once optical recording medium with ZnO near-field optical interaction layer of claim 1, wherein said transparent substrate is made of $SiO_2$ glass materials and doped $SiO_2$ glass materials containing materials selected from Sodium(Na), Lithium(Li), Calcium(Ca), Potassium (K), Aluminum(Al), Germanium(Ge), and Boron (B).

3. The write-once optical recording medium with ZnO near-field optical interaction layer of claim 1, wherein said transparent substrate is made of the transparent polymerized materials which comprise one of polycarbonate, and epoxy resin.

4. The write-once optical recording medium with ZnO near-field optical interaction layer of claim 1, wherein said first transparent dielectric thin film layer, said second transparent dielectric thin film layer and said third transparent dielectric thin film layer are selected from a group of the transparent dielectric materials consisting of $ZnS$—$SiO_x$, $SiO_x$, and $SiN_x$.

5. The write-once optical recording medium with ZnO near-field optical interaction layer of claim 4, wherein said first transparent dielectric thin film layer, said second transparent dielectric thin film layer and said third transparent dielectric thin film layer are single one of a single and a multiple layer structure.

6. The write-once optical recording medium with ZnO near-field optical interaction layer of claim 4, wherein the optimal thickness of said first transparent dielectric thin film layer is in a range between 50 nm to 300 nm.

7. The write-once optical recording medium with ZnO near-field optical interaction layer of claim 4, wherein the optimal thickness of said second transparent dielectric thin film layer is in a range between 5 nm to 100 nm.

8. The write-once optical recording medium with ZnO near-field optical interaction layer of claim 4, wherein the optimal thickness of said third transparent dielectric thin film layer is in a range between 5 nm to 100 nm.

9. The write-once optical recording medium with zinc-oxide near-field optical interaction layer of claim 1, wherein said first transparent dielectric thin film layer, said second transparent dielectric thin film layer and said third transparent dielectric thin film layer are of a single and a multiple layer structure.

10. The write-once optical recording medium with ZnO near-field optical interaction layer of claim 1, wherein the optimal thickness of said first transparent dielectric thin film layer is in a range between 50 nm to 300 nm.

11. The write-once optical recording medium with ZnO near-field optical interaction layer of claim 1, wherein the optimal thickness of said second transparent dielectric thin film layer is in a range between 5 nm to 100 nm.

12. The write-once optical recording medium with ZnO near-field optical interaction layer of claim 1, wherein the optimal thickness of said third transparent dielectric thin film layer is in a range between 5 nm to 100 nm.

13. The write-once optical recording medium with ZnO near-field optical interaction layer of claim 1, wherein said zinc-oxide (ZnO) nano-structured thin film layer that is capable of causing localized near-field optical effect is made of one of a compound of zinc-oxide, and compositions of zinc-oxide and zinc.

14. The write-once optical recording medium with ZnO near-field optical interaction layer of claim 13, wherein the optimal thickness of said z zinc-oxide (ZnO) nano-structured thin film layer that is capable of causing localized near-field optical effect is in a range between 5 nm to 100 nm.

15. The write-once optical recording medium with ZnO near-field optical interaction layer of claim 1, wherein the optimal thickness of said zinc-oxide (ZnO) nano-structured thin film layer that is capable of causing localized near-field optical effect is in a range between 5 nm to 100 nm.

16. The write-once optical recording medium with ZnO near-field optical interaction layer of claim 1, wherein said write-once recording thin film layer is selected from a group of organic dyes consisting of Cyanine, Phthalo-cyanine, Azo, Azo-metal, Azo-metal complex, and a group of inorganic write-once materials consisting of $Ag_xIn_y$, $TeO_x$ with Gold (Au), and Palladium (Pd).

17. The write-once optical recording medium with ZnO near-field optical interaction layer of claim 16, wherein said write-once recording thin film layer is one of a single and a multiple layer structure.

18. The write-once optical recording medium with ZnO near-field optical interaction layer of claim 16, wherein the optimal thickness of the write-once recording thin film layer is in a range between 5 nm to 100 nm.

19. The write-once optical recording medium with ZnO near-field optical interaction layer of claim 1, wherein said write-once recording thin film layer is one of a single and a multiple layer structure.

20. The write-once optical recording medium with ZnO near-field optical interaction layer of claim 1, wherein the optimal thickness of the write-once recording thin film layer is in a range between 5 nm to 100 nm.

* * * * *